(12) United States Patent
Chen et al.

(10) Patent No.: US 7,661,115 B2
(45) Date of Patent: Feb. 9, 2010

(54) METHOD, APPARATUS AND PROGRAM STORAGE DEVICE FOR PRESERVING LOCKED PAGES IN MEMORY WHEN IN USER MODE

(75) Inventors: Chiahong Chen, Tucson, AZ (US); Radha K. Ramachandran, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 11/342,493

(22) Filed: Jan. 30, 2006

(65) Prior Publication Data

US 2007/0198998 A1  Aug. 23, 2007

(51) Int. Cl.
*G06F 9/54* (2006.01)
*G06F 9/00* (2006.01)

(52) U.S. Cl. .......................... 719/328; 718/104
(58) Field of Classification Search .................. 719/328
See application file for complete search history.

(56) References Cited

U.S. PATENT DOCUMENTS

| | | | |
|---|---|---|---|
| 5,504,928 A * | 4/1996 | Cook et al. .................. 710/62 |
| 5,754,889 A | 5/1998 | Packer | |
| 6,085,217 A | 7/2000 | Ault et al. | |
| 6,167,437 A | 12/2000 | Stevens et al. | |
| 6,192,389 B1 | 2/2001 | Ault et al. | |
| 6,516,339 B1 | 2/2003 | Potts, Jr. et al. | |
| 6,529,985 B1 | 3/2003 | Deianov et al. | |
| 6,567,839 B1 | 5/2003 | Borkenhagen et al. | |
| 6,654,782 B1 | 11/2003 | O'Brien et al. | |
| 6,658,522 B1 * | 12/2003 | Martin et al. .................. 711/1 |
| 6,871,219 B2 | 3/2005 | Noordergraaf et al. | |
| 7,219,347 B1 * | 5/2007 | Waddington ................ 718/104 |
| 2002/0038332 A1 | 3/2002 | Alverson et al. | |
| 2003/0177323 A1 | 9/2003 | Popp et al. | |
| 2005/0114609 A1 | 5/2005 | Shorb | |

* cited by examiner

*Primary Examiner*—Hyung S Sough
*Assistant Examiner*—Abdou K Seye
(74) *Attorney, Agent, or Firm*—Griffiths & Seaton PLLC

(57) ABSTRACT

A method, apparatus and program storage device for preserving locked pages in memory when in user mode. A user command daemon is provided for executing a command string received from a user application. A socket interface is disposed between the user command daemon and the application for routing signals between the user application and the user command daemon. The user command daemon provides a returned value to application for loading into memory without causing latencies to the running of the application.

11 Claims, 6 Drawing Sheets

METHOD, APPARATUS AND PROGRAM STORAGE DEVICE FOR PRESERVING LOCKED PAGES IN MEMORY WHEN IN USER MODE

BACKGROUND OF THE INVENTION

1. Field of the Invention

This invention relates in general to a computer operating systems, and more particularly to a method, apparatus and program storage device for preserving locked pages in memory when in user mode.

2. Description of Related Art

A thread is a sequence of instructions. Multiple threads can be executed in parallel on many computer systems. Multithreading generally occurs by time slicing where a single processor switches between different threads or by multiprocessing where threads are executed on separate processors. Threads are similar to processes, but differ in the way that they share resources. Many modern operating systems directly support both time-sliced and multiprocessor threading with a process scheduler. The operating system kernel allows programmers to manipulate threads via the system call interface.

Operating systems generally implement threads in one of two ways: preemptive multithreading, or cooperative multithreading. Preemptive multithreading allows the operating system to determine when a context switch should occur. The term context simply refers to all the information that completely describes the process's current state of execution, e.g., the contents of the CPU registers, the program counter, the flags, etc. The process of saving the currently executing process's context, flushing the CPU, and loading the next process's context, is called a context switch. A context switch for a full-fledged, multithreaded process will obviously take a lot longer than a context switch for an individual thread within a process. So depending on the amount of hardware support for context switching and the type of context switch, a context switch can take a decent amount of time, thereby costing a number of CPU cycles. Cutting back on context switches improves execution efficiency and reduces delays, as does the extensive use of multithreading since thread switches are usually faster than full-sized process switches.

Cooperative multithreading, on the other hand, relies on the threads themselves to relinquish control once they are at a stopping point. This can create problems if a thread is waiting for a resource to become available. The disadvantage to preemptive multithreading is that the system may make a context switch at an inappropriate time, causing priority inversion or other bad effects if there are real-time requirements at the application level, which may be avoided by cooperative multithreading.

In multithreaded operating systems, all threads in a task share the same address space and are usually sharing large amounts of data. Context switching between two threads in the same task may take much less time than context switching between two threads in different tasks. After a context switch in a multithreaded system a new thread will be running, and perhaps a new task.

The kernel mode is a privileged mode in which only the kernel runs and which provides access to all memory locations and all other system resources. Context switches can occur only in kernel mode. Other programs, including applications, initially operate in user mode, but they can run portions of the kernel code via system calls. A system call is a request by an active process for a service performed by the kernel, such as input/output (I/O) or process creation.

To implement a real-time application in user mode, it is highly desirable to have the text and data required by the application always reside in the memory. For a typical user mode application, text and data are paged in as and when needed. Memory is divided into a number of fixed size or variable sized partitions or regions that are allocated to running processes. The variable size partition scheme may result in a situation where available memory is not contiguous, but fragmented into many scattered blocks. To solve this problem, the memory may be compacted thereby making large free memory blocks or a paging scheme may be used, which allows a program's memory to be noncontiguous thereby permitting a program to be allocated physical memory wherever it is available.

However, paging schemes influence process scheduling. When a process is to be executed, the scheduler checks its size expressed in pages. Available memory is examined for that process. If the process requires N pages, there must be N frames available in memory that must be allocated to this process before the process can be executed. Thus, when the code is running there will be cases where the underlying operating system has to stop executing the process code and wait for the text or data to be paged into the main memory. This is done in a transparent method that a user application is not aware that it is waiting on a page. However, it does cause unexpected delays and context switching which are very expensive in a tightly time bound process.

This issue is circumvented by loading and locking in the memory all the code and data that a real-time application is going to require during the initial bring-up of the process. However, if at any point of time the process gets context switched out after the initial bring-up process, problems may occur in the system due to the delays in context switching and the unexpected changes of timing among interacting processes inside the real-time application with stringent timing requirements.

There is also a potential problem when a process is running in user mode. If at any point of time the process calls "system (cmd)" to run command 'cmd', that translates to forking a process and making the process do the work related to 'cmd'. Each process has process context, which is everything that is unique about the state of the program you are currently running. A fork in a multithreading environment means that a thread of execution is duplicated. When a new process is forked, it shares relatively little data with the parent process that created it; when a new thread is created, it shares much more information (such as all the global variables and static local variables, the open files, and the process ID). Specifically in an operating system like Linux, whenever a process does a fork, it changes the property of all the memory pages used by the process to "copy on write". This unlocks the memory pages previously locked by the process and can cause the operating system to page out or drop these unlocked memory pages when the system comes under memory stress. As a result, a real-time application will go through the undesired re-loading of the memory pages later during its execution even when it has attempted to "lock" the memory pages in the first place during the initialization. A temporary suspension of program execution due to the delays when a required memory page is being brought in can introduce problems to a real-time application.

It can be seen then that there is a need for a method, apparatus and program storage device for preserving locked pages in memory when in user mode.

SUMMARY OF THE INVENTION

To overcome the limitations in the prior art described above, and to overcome other limitations that will become apparent upon reading and understanding the present specification, the present invention discloses a method, apparatus and program storage device for preserving locked pages in memory when in user mode.

The present invention solves the above-described problems by executing the "system(cmd)" while maintaining memory pages in a locked state while the command is processed by a user command daemon.

An apparatus in accordance with an embodiment of the present invention preserves locked pages in memory when in user mode. The apparatus includes a user command daemon for executing a command string received from a user application and a socket interface disposed between the user command daemon and the application, for routing signals between the user application and the user command daemon. The user command daemon provides a returned value to the socket interface in response to execution of the command string and the socket interface provides the returned value to the application for loading into memory without causing latencies to the running of the application.

In another embodiment of the present invention a method for preserving locked pages in memory when in user mode is provided. In another embodiment of the present invention, a program storage device that includes program instructions executable by a processing device to perform operations for preserving locked pages in memory when in user mode is provided. The method and program storage device provide for running an application with all required memory pages locked in main memory, sending a command string from the application to a user command daemon, executing the command string by the user command daemon to produce a returned value and returning the returned value to the application for loading into memory without causing latencies to the running of the application.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for preserving locked pages in memory when in user mode. A "system(cmd)" is executed in a different process context, in which case the memory pages locked by a real-time application remain intact and the returned value provided in response to the executed command is provided to the memory with causing any latencies.

Figure 1:
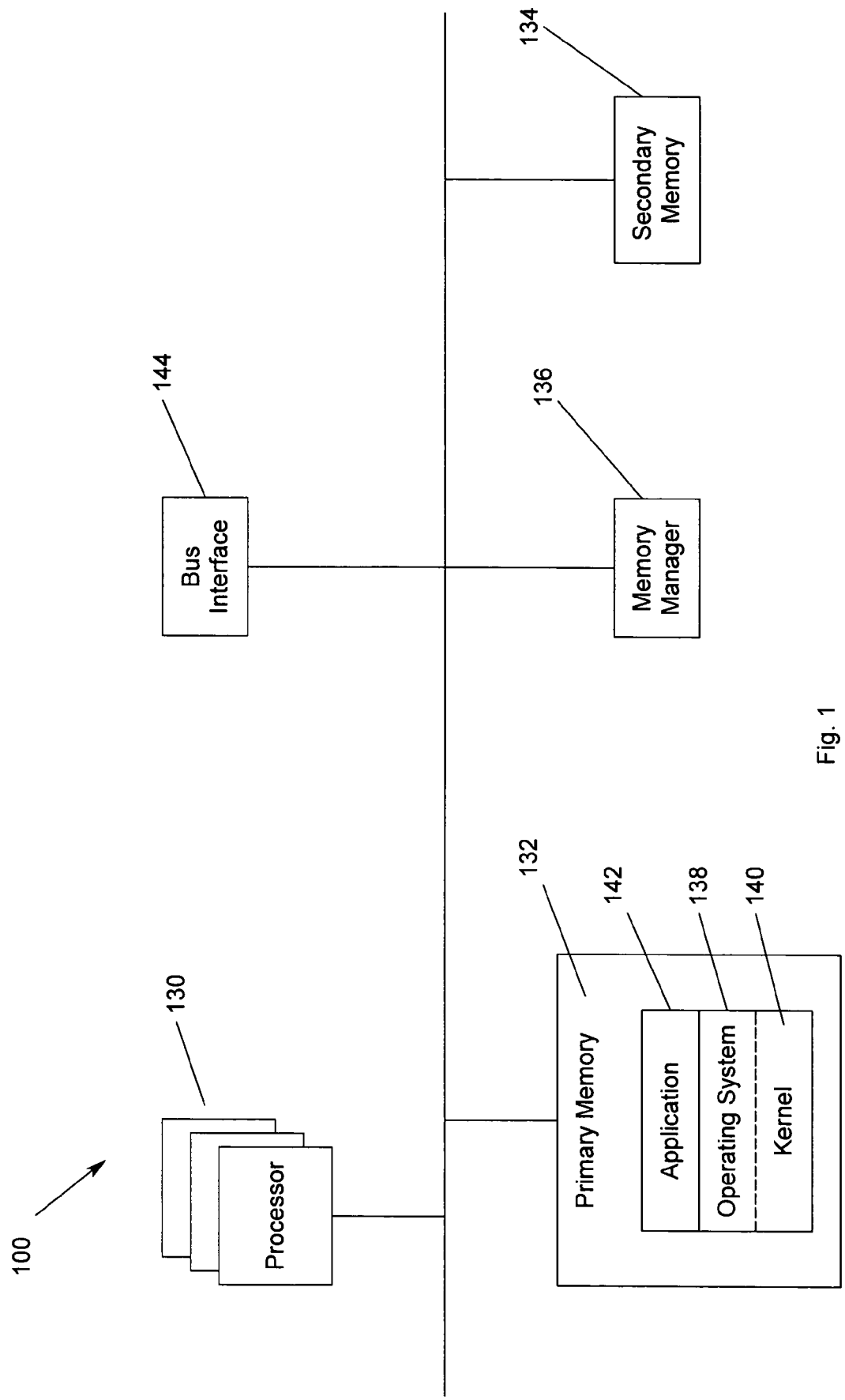
FIG. 1 illustrates a block diagram of a computer system according to an embodiment of the present invention.

FIG. 1 illustrates a block diagram of a computer system 100 according to an embodiment of the present invention. In FIG. 1, the computer system 100 includes one or more processors 130, which are each capable of executing a thread within one of a number of concurrent multithreaded processes. As is typical in multitasking data processing systems, each user process may be allocated its own virtual memory space, which may be mapped partially into a high-speed primary memory 132 and partially into a lower speed secondary memory 134 by memory manager 136.

The computer system 100 and the allocation of system resources to the computer system 100 are controlled by operating system 138. For the purpose of the present discussion, it is assumed that operating system 138 is resident within primary memory 132, although those skilled in the art will appreciate that certain infrequently utilized segments of operating system 138 may be swapped out to secondary memory 134 by memory manager 136. Operating system 138 includes kernel 140, which comprises the lowest layer of operating system 138 that interacts most directly with the computer system 100. Kernel 140 dispatches kernel threads to processors 130 for execution, provides services to device drivers interfacing with hardware within computer system 100, and implements system services, memory management, network access, and the file system utilized by computer system 100. In addition to kernel 140, primary memory 132 also stores frequently utilized segments of application software 142. As is well-known to those skilled in the art, application software 142 communicates with operating system 138 through an Application Programming Interface (API).

Computer system 100 also includes bus interface 144 through which multiple nodes can interface to system resources available within computer system 100. As will be appreciated by those skilled in the art, computer system 100 may also include additional hardware coupled to system bus 146 that is not necessary for an understanding of the present invention and is accordingly omitted for simplicity.

Figure 2:
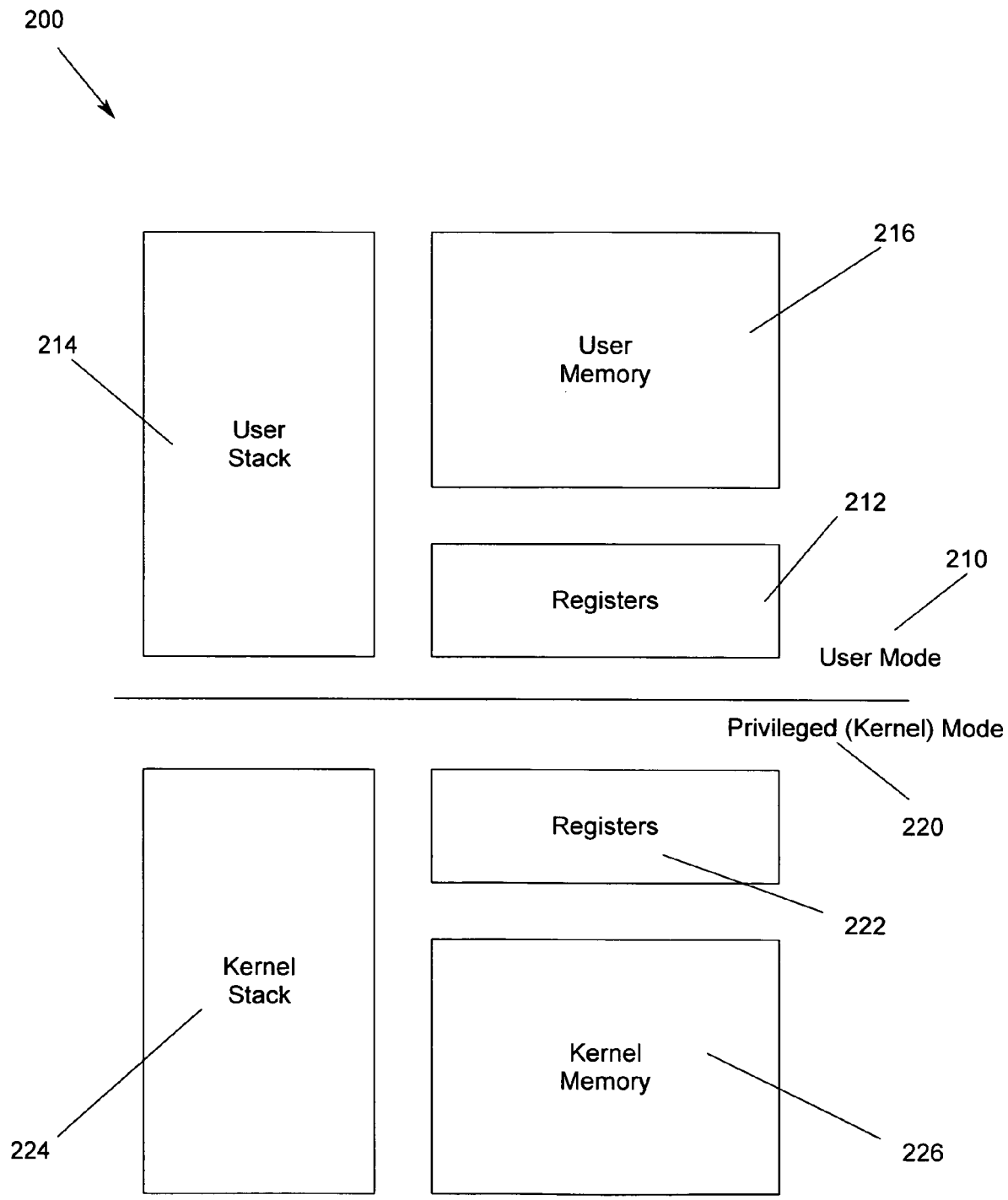
FIG. 2 shows the user mode and kernel mode states according to an embodiment of the present invention.

FIG. 2 shows the user mode and kernel mode states 200 according to an embodiment of the present invention. In FIG. 2, a user mode 210 and kernel mode 220 are shown. Applications and subsystems run on the computer in user mode 210. Processes that run in user mode 210 do so within their own virtual address spaces. They are restricted from gaining direct access to many parts of the system, including system hardware, memory not allocated for user mode 210, and other portions of the system that might compromise system integrity.

Processes that run in kernel-mode 220 can directly access system data and hardware, and are not restricted like processes running in user-mode 210. Performance-sensitive drivers and services run in kernel mode 220 to interact with hardware more efficiently. All components for processes running in kernel-mode 220 are fully protected from applications running in user mode 210. Processes that run in user mode 210 are effectively isolated from processes running in kernel-mode 220 and other processes running in user-mode 210.

In FIG. 2, a thread for a process running in user mode 210 is characterized as having its own context including registers 212 and memory stack 214. A user stack 214 is a data structure that includes a series of memory locations and a pointer to the initial location. All processors provide instructions for placing and retrieving values to and from the stack 214. The user memory 216 is a block of memory that is dedicated to the use of a current process running in user mode 210. A complete user state of a thread is maintained in user registers 212.

The kernel operates in its own protected address space and includes its own registers 222 and kernel stack 224. The kernel maintains the integrity of its own data structures and that of other processes. The kernel stack 224 includes information used by the kernel. Kernel memory 226 is generally shared by all processes, but is only accessible in kernel mode 220. Context changes from one task to another happen on the kernel stack 214 of the current process.

Figure 3:
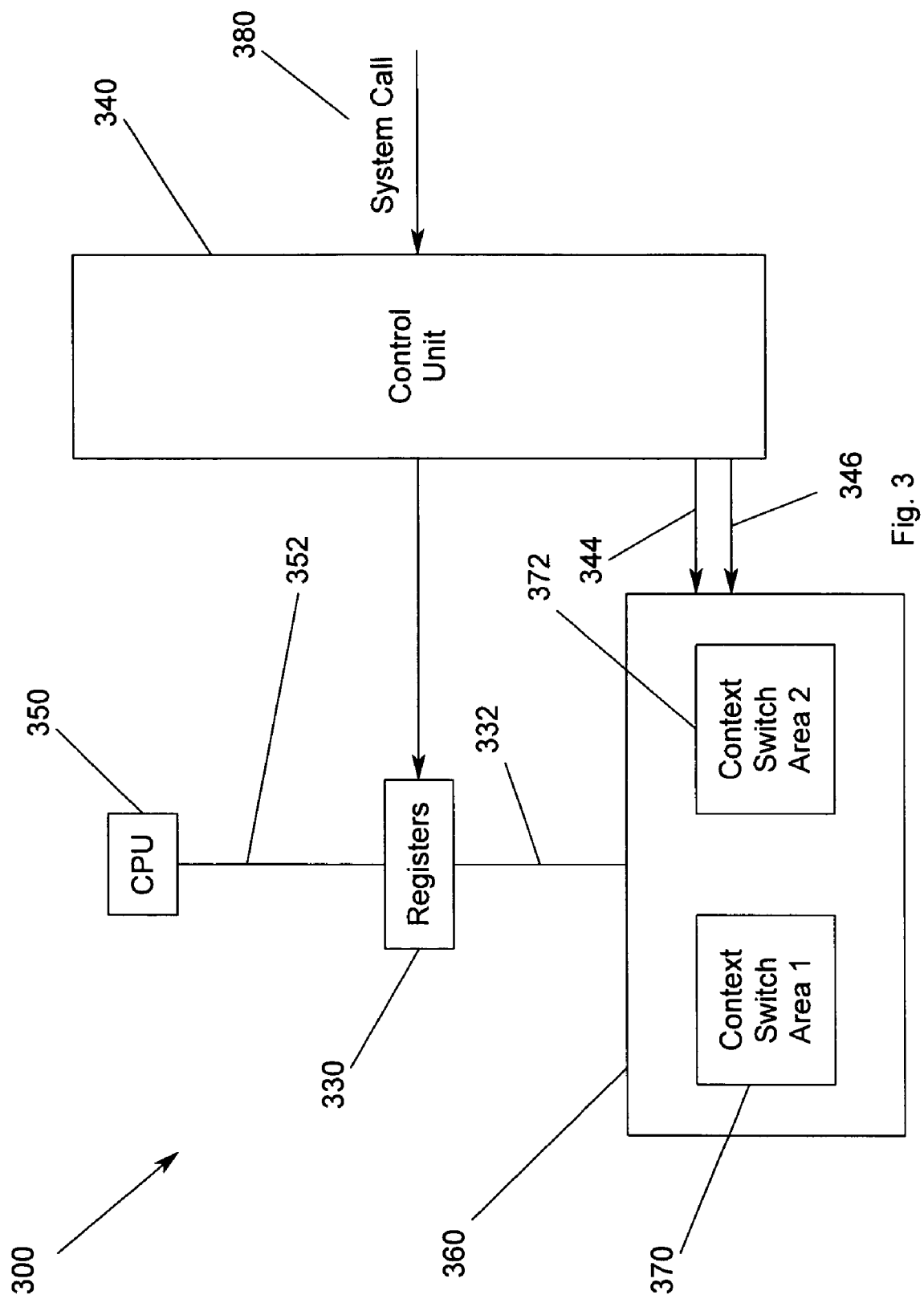
FIG. 3 is a system showing how memory pages may be unlocked.

FIG. 3 is a system 300 showing how memory pages may be unlocked. The system includes a CPU 350 and a set of register files 330. A control unit 340 controls the set of register files 330 and memory module 360. Memory module 360 has a plurality of context save areas 370, 372, in which contexts can be saved. The CPU 350 is coupled to the set of register files 330 via data bus 352. Control unit 340 is coupled to the set of register files 330 via control bus 342 accordingly, and is further coupled to memory module 360 via control bus 344 and through memory address bus 346. Register files 330 are coupled to memory module 360 via bus 332. Control unit 340 receives forward request 380 and backward requests 382 and determines a register file to be accessed by CPU 350 and which context is to be transferred between the register file and context save areas 370, 372 within memory module 360.

When a system call 380 is issued, a sequence of instructions is typically run to save the current context of the processor. This method by which the operating system makes one CPU suspend the execution of on process, and continue or begin executing a second process is referred to as a context switch. During a context switch, the CPU switches to using the full context of the second process, i.e., its execution stack, its memory area, the values the registers contained when last executing this process. A context switch is invoked when the current process is preempted by a system call. However, as mentioned above, if at any point of time a user process calls "system(cmd)" to run command 'cmd', that translates to forking a process and making the process do the work related to 'cmd'. This unlocks the memory pages previously locked by the process and can cause the operating system to page out or drop these unlocked memory pages when the system comes under memory stress. As a result, a real-time application will go through the undesired re-loading of the memory pages later during its execution even when it has attempted to "lock" the memory pages in the first place during the initialization. A temporary suspension of program execution due to the delays when a required memory page is being brought in can introduce problems to a real-time application.

Figure 4:
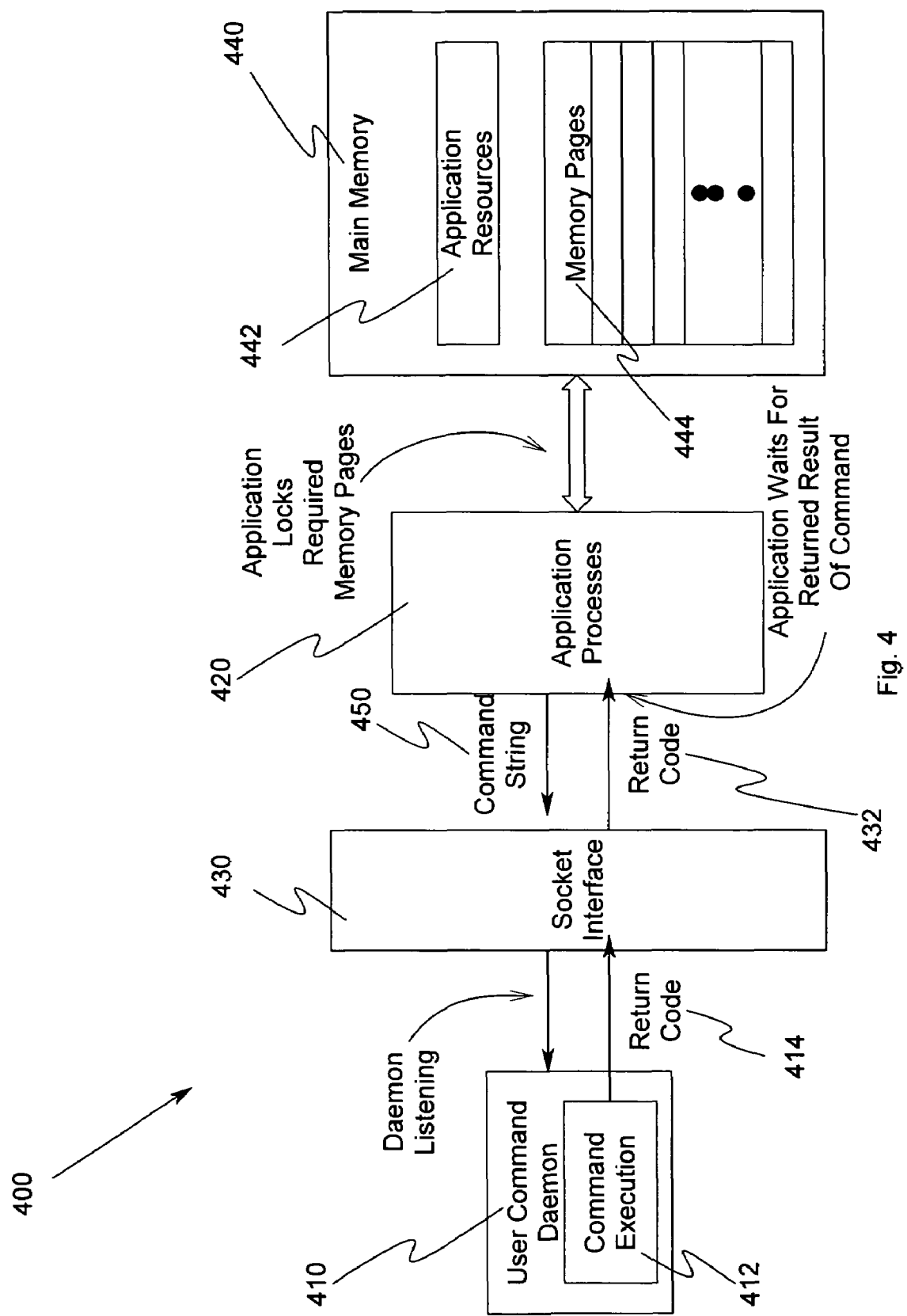
FIG. 4 illustrates an operating system wherein locked pages are preserved in memory when in user mode according to an embodiment of the present invention.

FIG. 4 illustrates an operating system 400 wherein locked pages are preserved in memory when in user mode according to an embodiment of the present invention. In FIG. 4, a user command daemon 410 is provided to avoid "system(cmd)" calls being run on the same context as a real-time user application 420. The daemon 410 communicates with an application 420 through a socket interface 430. Memory 440 is used by the application 420 to provide the application resources 442. The computer memory 440 is further divided into small partitions, wherein memory 440 is allocated using a page 444 as the smallest building block.

The main real-time user application 420 runs with all the memory pages 444 it requires locked in main memory 440. The user command daemon 410 waits to receive a command from the main user application 420. Whenever the main user application 420 needs to run a "system(cmd)", the user application 420 sends the command string 450 across to the daemon 410 through the socket interface 430. The socket interface 430 supports communication between the user application 420 and the daemon 410. When the daemon 410 receives the string command from the main user application 420, the daemon 410 executes the command by calling the "system(cmd)". The command execution block 412 executes the command and returns code 414 in response to the executed command. The returned value 414 is returned to the socket interface 430, which is waiting for the returned value 414. The socket interface 430 provides the returned code 432 to the user application 420.

Accordingly, the "system(cmd)" call may be run while simultaneously retaining all the process memory 440 in the locked state so there will be no latencies caused because of page faults within the main real-time user application 420. As the process is being forked on the daemon 410 side, the memory 440 locked by the real-time application 420 remains intact, and unnecessary task suspensions are avoided when the pager actually brings the code into the memory 440. This increases the performance and avoids other race conditions.

Figure 5:
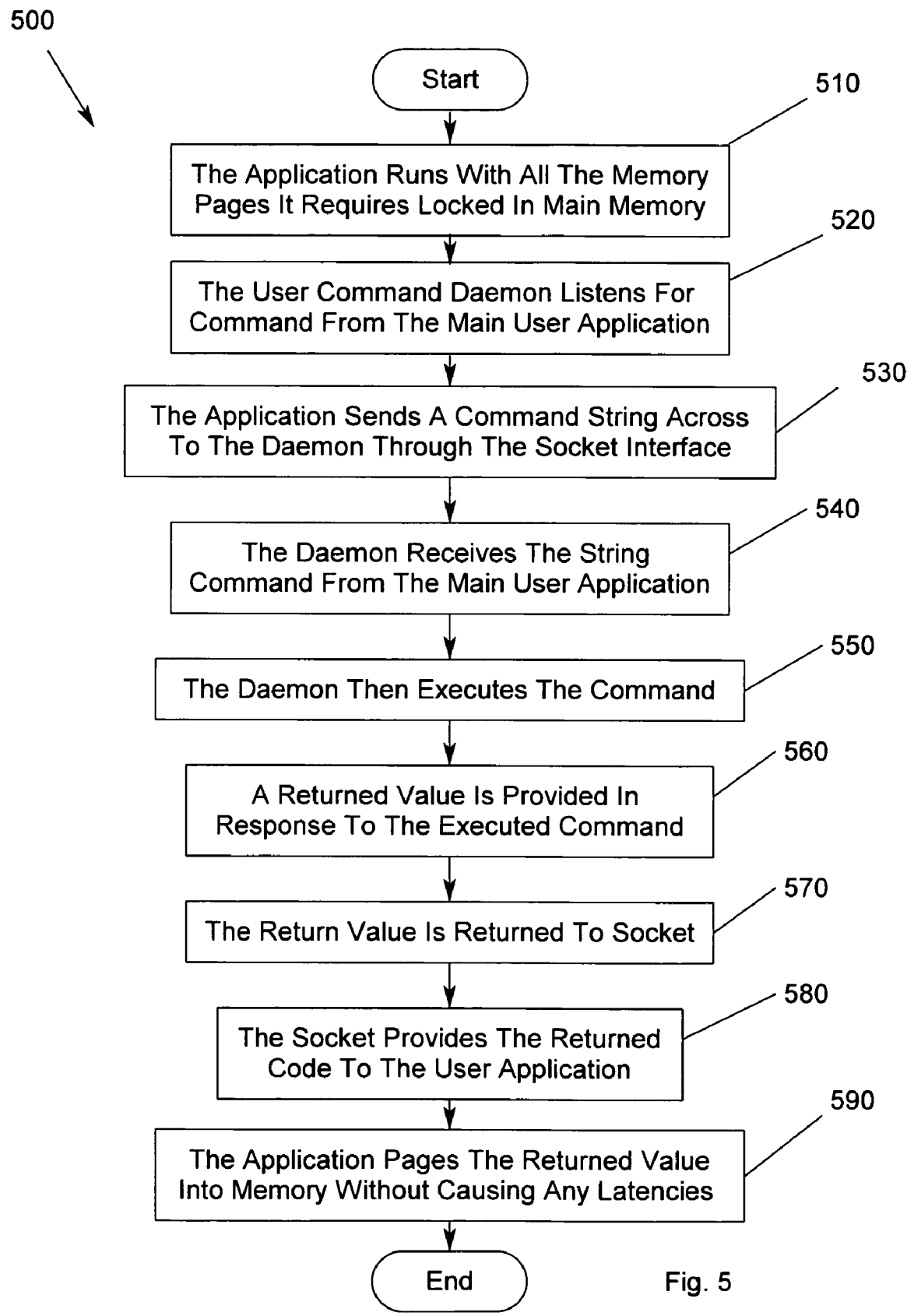
FIG. 5 is a flow chart of a method for preserving locked pages in memory when in user mode according to an embodiment of the present invention.

FIG. 5 is a flow chart 500 of a method for preserving locked pages in memory when in user mode according to an embodiment of the present invention. In FIG. 5, the application runs with all the memory pages it requires locked in main memory 510. The user command daemon waits for command from the main user application 520. The application sends a command string across to the daemon through the socket interface 530. The daemon receives the string command from the main user application 540. The daemon then executes the command 550. A returned value is provided in response to the executed command 560. The returned value is returned to socket 570. The socket provides the returned code to the user application 580. The application pages the returned value into memory without causing any latencies 590.

Figure 6:
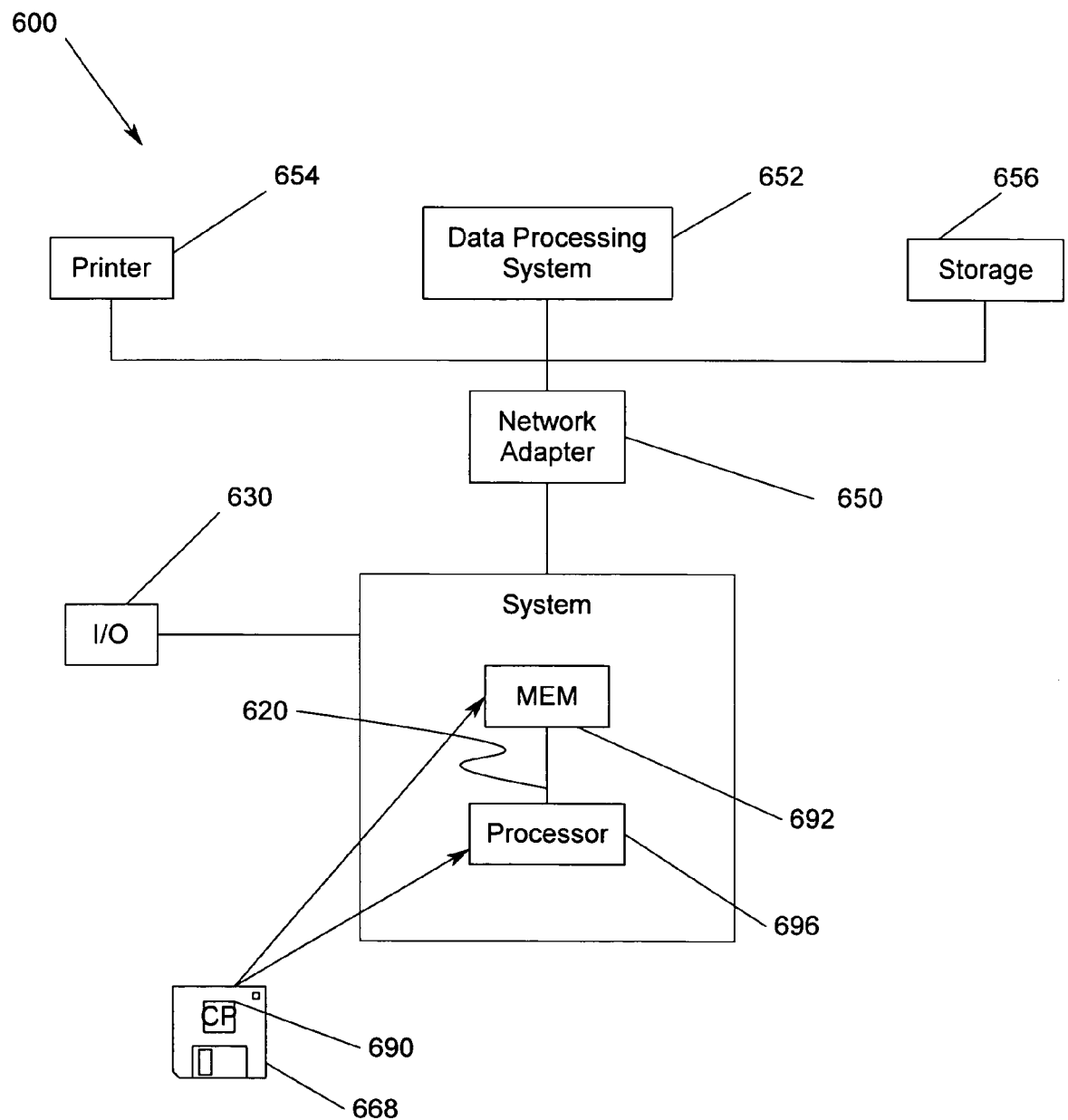
FIG. 6 illustrates a system according to an embodiment of the present invention.

FIG. 6 illustrates a system 600 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 690 accessible from a computer-usable or computer-readable medium 668 providing program code for use by or in connection with a computer or any instruction execution system.

For the purposes of this description, a computer-usable or computer readable medium 668 can be any apparatus that can contain, store, communicate, propagate, or transport the program for use by or in connection with the instruction execution system, apparatus, or device. The medium 668 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor 696 coupled directly or indirectly to memory elements 692 through a system bus 620. The memory elements 692 can include local memory employed during actual execution of the program code, bulk storage, and cache memories which provide temporary storage of at least some program code in order to reduce the number of times code must be retrieved from bulk storage during execution.

Input/output or I/O devices 640 (including but not limited to keyboards, displays, pointing devices, etc.) can be coupled to the system either directly to the system or through intervening I/O controllers.

Network adapters 650 may also be coupled to the system to enable the system to become coupled to other data processing systems 652, remote printers 654 or storage devices 656 through intervening private or public networks 660. Modems, cable modem and Ethernet cards are just a few of the currently available types of network adapters.

Accordingly, the computer program 690 comprise instructions which, when read and executed by the system 600 of FIG. 6, causes the system 600 to perform the steps necessary to execute the steps or elements of the present invention The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for preserving locked pages in memory when a process is operating in user mode, comprising:
    a processor; and
    a memory coupled to the processor, the memory including:
        an application requiring a plurality of memory pages in a locked state during execution;
        a user command daemon for executing a command string received from the application, the user command daemon configured to execute the command string while simultaneously retaining the plurality of memory pages in the locked state; and
        a socket interface disposed between the user command daemon and the application, for routing signals between the application and the user command daemon;
    wherein:
        the user command daemon provides a value to the socket interface in response to execution of the command string, and executes the command string on a same context as the application,
        the socket interface provides the value to the application,
        the application loads the value into the memory without causing latencies to the running of the application, and
        execution of the command string by the user command daemon while retain all process memory for the application in the locked state prevents unnecessary task suspensions when the value is loaded into the memory.

2. The apparatus of claim 1, wherein the user command daemon includes an execution block for executing command strings received from the application.

3. The apparatus of claim 1, wherein the user command daemon is configured to wait to receive the command string from the application.

4. A method for preserving locked pages in memory when a process is operating in user mode, comprising:
    running an application, by a processor, with a plurality of memory pages in a locked state in main memory;
    determining, by the processor, that the application needs to run a command string;
    sending the command string from the application to a user command daemon including a socket interface the user command daemon is configured to monitor, wherein the command string received by the socket interface is forwarded to the user command daemon;
    executing the command string by the user command daemon while simultaneously retaining the plurality of memory pages in the locked state to prevent unnecessary task suspensions when a value is loaded into the memory, the executed command string producing the value, wherein the command string is executed by the user command daemon on a same context as the application;
    returning the value to the application; and
    loading the value into memory without causing latencies to the running of the application.

5. The method of claim 4 further comprising waiting by the user command daemon for a command string from the application.

6. The method of claim 4, wherein the returning the value to the application for loading into memory without causing latencies to the running of the application further comprises providing the value from the user command daemon to a socket interface and forwarding the value received by the socket interface to the application.

7. The method of claim 4 further comprising paging the value by the application into memory without causing any latencies.

8. A computer-readable storage medium comprising instructions that, when executed by a processor, cause the processor to perform a method comprising the steps of:
    running an application with a plurality of memory pages in a locked state in main memory;
    determining that the application needs to run a command string;
    sending the command string from the application to a user command daemon associated with the application including a socket interface the user command daemon is configured to monitor, wherein the command string received by the socket interface is forwarded to the user command daemon;
    executing the command string by the user command daemon while simultaneously retaining the plurality of memory pages in the locked state to prevent unnecessary task suspensions when a value is loaded into the memory, the executed command string producing the value, wherein the command string is executed by the user command daemon on a same context as the application;
    returning the value to the application; and loading the value into memory without causing latencies to the running of the application.

9. The computer-readable storage medium of claim 8 further comprising instructions that cause the processor to perform the step of waiting, by the user command daemon, for a command string from the application.

10. The computer-readable storage medium of claim 8, wherein the instructions that cause the processor to perform the step of returning the value to the application for loading into memory without causing latencies to the running of the application further comprises instructions that cause the processor to perform the step of providing the value from the user command daemon to a socket interface and forwarding the value received by the socket interface to the application.

11. The computer-readable storage medium of claim 8 further comprising instructions that cause the processor to perform the step of paging the value by the application into memory without causing any latencies.

* * * * *

UNITED STATES PATENT AND TRADEMARK OFFICE
CERTIFICATE OF CORRECTION

PATENT NO. : 7,661,115 B2  Page 1 of 1
APPLICATION NO. : 11/342493
DATED : February 9, 2010
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Thirtieth Day of November, 2010

David J. Kappos
*Director of the United States Patent and Trademark Office*